United States Patent Office
2,833,690
Patented May 6, 1958

2,833,690

MAGNESIUM HYDROXIDE SUSPENSIONS CONTAINING SEA-PLANT HYDROCOLLOID

Durward N. Entrekin, New Brunswick, N. J., assignor to Olin Mathieson Chemical Corporation, New York, N. Y., a corporation of Virginia No Drawing. Application August 15, 1956
Serial No. 604,060

3 Claims. (Cl. 167—56)

This invention relates to compositions of matter, more particularly to pharmaceutical preparations essentially comprising an aqueous suspension of magnesium hydroxide.

Magnesium hydroxide is widely employed as an antacid and/or mild laxative. For such purpose, magnesium hydroxide is formulated either as a magma (e. g., milk of magnesia), or as tablets. Milk of magnesia, however, is subject to various disadvantages. Thus, it tends to separate out on standing; and after freezing (and thawing), the preparation is generally unusable. Furthermore, the viscosity and (earthy) taste of the suspension is such that it is unpalatable to children and even adults, and hence unpleasant to take.

It is an object of this invention, therefore, to provide a more stable and palatable pharmaceutical preparation essentially comprising an aqueous suspension of magnesium hydroxide.

This object is achieved by the compositions of this invention, which comprise an aqueous suspension of magnesium hydroxide in which has been incorporated a refined sea-plant hydrocolloid in an amount sufficient to stabilize the suspension without objectionably affecting viscosity. Preferably the hydrocolloid is derived primarily from a plant of the group consisting of *Chondrus crispus* and *Gigartina mamillosa*, and essentially comprises mixed salts of a polysaccharide sulfate. Preferably too, the concentration of the hydrocolloid is at least about 0.6% by weight and below the amount objectionably affecting viscosity (readily ascertainable by test), and optimally is of the order of 0.8% by weight.

The concentration of magnesium hydroxide in the aqueous suspension may be varied considerably. Desirably, it is at least about 7% by weight; and it should, of course, be below that at which the thickness of the preparation becomes objectionable, which is readily ascertainable by test.

The compositions of this invention may also (and desirably should) include a sweetening agent (e. g., saccharin), flavoring agent (e. g., oil peppermint), and preservatives (e. g., methyl parahydroxybenzoate, propyl parahydroxybenzoate). Some preservatives are known to be ineffective in the presence of refined sea-plant hydrocolloids, and hence should be avoided in the compositions of this invention.

The hydrocolloid employed must, of course, be soluble in cold water and of such a nature as not to precipitate or bind the magnesium. Moreover, it should desirably have an alkaline reaction, preferably providing a pH of of the order of 10. Certain refined sea-plant hydrocolloids have been found to meet these specifications exceptionally well (in addition, of course, to accomplishing the objective of improving stability and palatability). These hydrocolloids are obtained from the sea plants *Chondrus crispus* and *Gigartina mamillosa*. They are light amber to colorless, free-flowing powders (ground, for example, to pass a 40 mesh screen). They are essentially mixed salts of a polysaccharide sulfate. Galactose units account for approximately two-thirds of the total organic matter; and the remaining units are also 6-carbon sugars. The degree of sulfation is fairly high, there being one sulfate group for each carbohydrate unit. The associated cations, in decreasing order of magnitude, are sodium, potassium, calcium and magnesium, plus traces of other basic elements found in sea water. Analysis of hydrolysis products indicates a branced rather than a linear structure. The average molecular weight is approximately 200,000. The general configuration of the major portion of the molecule appears to be:

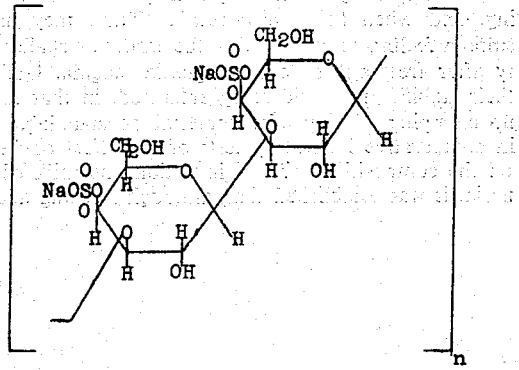

Such a hydrocolloid is obtained from dried Irish moss by washing to eliminate impurities, cooking to extract the hydrocolloids, separating the extract, filtering, evaporating, drying the resultant concentrate, and pulverizing the product. Examples of hydrocolloids thus obtained are those marketed under the trade name "Sea Kem" by the Seaplant Chemical Corporation of New Bedford, Massachusetts.

The composition of this invention are conveniently prepared by incorporating the hydrocolloid into the aqueous suspension of magnesium hydroxide, and homogenizing the resultant mixture. The sweetening and flavoring agents, and/or the preservative may be added at any stage. The resultant composition may then be packaged in the same manner as milk of magnesia, for use as an antacid and/or laxative in the same manner (assuming the composition has the same magnesium hydroxide concentration as milk of magnesia; if higher, the dosage would be correspondingly lowered).

The following example is illustrative of the invention:

| Composition | Per 1 liter |
|---|---|
| Milk of Magnesia, USP | 1,000 cc. |
| Refined sea-plant hydrocolloid (e. g., Sea Kem) | 8 Gm. |
| Saccharin, Soluble Powder, USP | 1 Gm. |
| Methyl Parahydroxybenzoate, USP | 1 Gm. |
| Propyl Parahydroxybenzoate, USP | 0.5 Gm. |
| Oil Peppermint, USP, redistilled | 0.1 cc. |
| to make | ca. 1,000 cc. |

The milk of magnesia is placed in a suitable stainless steel or glass-lined container equipped with a stirrer of sufficient size to agitate the thick magma at a rapid rate (it may be necessary to use two stirrers to obtain sufficient agitation). The refined sea-plant hydrocolloid is added slowly, by sprinkling on the surface of the churning liquid. After the hydrocolloid has been stirred into the milk of magnesia, the remaining ingredients are added and the stirring continued until the hydrocolloid is completely hydrated. This stirring period will take several hours, depending upon the batch size and the rate of agitation. The composition is then passed through a homogenizer of the pressure-screening type, using pressures of 100 and 200 pounds respectively on the first and second stages. (The preferred homogenizer is of the type which pumps the composition under pressure between two closely restricted surfaces, imparting a tremendous velocity to the composition, and causing an abrasive action between the suspended particles and the faces of the restricted surfaces; and such homogenizer is also arranged so as to repeat the operation in a second stage, insuring a completely homogeneous system.)

The methyl parahydroxybenzoate and/or propyl parahydroxybenzoate may be replaced by an equivalent preservative, or even omitted from the above formulation if desired; and of course, the saccharin, and/or oil of peppermint may be omitted if such flavoring is not desired, or replaced by other desirable flavoring agents.

The superiority of the compositions of this invention over magnesia magma, USP, has been demonstrated with respect to stability, palatability and appearance (on standing, and when being dispensed). Thus, they have a smooth feeling as compared to the earthy or chalky (gritty after freezing) taste of magnesia magma, USP; and their stability is considerably enhanced, in that there is no clumping of suspended material on standing. Also, in comparative laboratory tests of the effect of freezing on the compositions of this invention and milk of magnesia, it was established that, although freezing and subsequent thawing caused a settling out of the suspended material in each case, the former were more easily resuspended by reshaking, and the improved palatability remained substantially unimpaired.

The invention may be variously otherwise embodied within the scope of the appended claims.

I claim:

1. A pharmaceutical composition comprising an aqueous suspension of magnesium hydroxide in which has been incorporated a refined sea-plant hydrocolloid, said hydrocolloid essentially comprising salts of a polysaccharide sulfate derived primarily from a plant of the group consisting of *Chondrus crispus* and *Gigartina mamillosa*.

2. The composition of claim 1 where the concentration of the hydrocolloid is about 0.6% by weight.

3. The composition of claim 1 wherein the concentration of hydrocolloid is of the order of 0.8% by weight.

References Cited in the file of this patent

Pharmaceutical Formulas, vol. 1, 1944, The Chemist and Druggists, London, England, pp. 413 and 414.

U. S. Dispensatory, 24th ed., 1947, Lippincott Co., Philadelphia, Pa., pp. 271, 272, 653 and 654.